United States Patent
Inoue et al.

(10) Patent No.: US 6,844,807 B2
(45) Date of Patent: Jan. 18, 2005

(54) HOME ELECTRONICS SYSTEM ENABLING DISPLAY OF STATE OF CONTROLLED DEVICES IN VARIOUS MANNERS

(75) Inventors: Yoshio Inoue, Hyogo (JP); Shinichiro Ohashi, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 444 days.

(21) Appl. No.: 09/782,282

(22) Filed: Feb. 14, 2001

(65) Prior Publication Data

US 2001/0030597 A1 Oct. 18, 2001

(30) Foreign Application Priority Data

Apr. 18, 2000 (JP) ........................................ 2000-116517

(51) Int. Cl.[7] .............................................. G05B 23/02
(52) U.S. Cl. ........................................ 340/3.7; 340/3.71
(58) Field of Search ........................ 340/3.1, 3.7, 3.71, 340/3.51, 3.53, 3.21, 825.49, 825.72; 700/83, 276, 9; 455/403

(56) References Cited

U.S. PATENT DOCUMENTS

| | | | | |
|---|---|---|---|---|
| 4,989,081 A | * | 1/1991 | Miyagawa et al. | 348/61 |
| 5,109,222 A | * | 4/1992 | Welty | 340/825.72 |
| 5,233,342 A | * | 8/1993 | Yashiro et al. | 340/3.7 |
| 5,467,078 A | * | 11/1995 | Koketsu | 340/3.53 |
| 5,579,221 A | * | 11/1996 | Mun | 700/83 |
| 5,661,468 A | * | 8/1997 | Marcoux | 340/7.1 |
| 5,668,537 A | * | 9/1997 | Chansky et al. | 340/3.7 |
| 5,905,442 A | * | 5/1999 | Mosebrook et al. | 340/3.7 |
| 6,020,881 A | * | 2/2000 | Naughton et al. | 345/740 |
| 6,021,324 A | * | 2/2000 | Sizer et al. | 455/403 |
| 6,182,094 B1 | * | 1/2001 | Humpleman et al. | 715/513 |
| 6,297,746 B1 | * | 10/2001 | Nakazawa et al. | 340/825.69 |
| 6,415,023 B2 | * | 7/2002 | Iggulden | 379/102.03 |
| 6,507,762 B1 | * | 1/2003 | Amro et al. | 700/83 |
| 6,563,430 B1 | * | 5/2003 | Kemink et al. | 340/825.49 |

FOREIGN PATENT DOCUMENTS

| | | |
|---|---|---|
| JP | 03-106293 | 2/1991 |
| JP | 07-030971 | 1/1995 |

* cited by examiner

*Primary Examiner*—Michael Horabik
*Assistant Examiner*—Nam V Nguyen
(74) *Attorney, Agent, or Firm*—McDermott Will & Emery LLP

(57) ABSTRACT

A home electronics system enabling rapid execution of remote control of controlled devices includes a home server, a cellular phone connected to the home server via a public line network, and devices to be controlled controlled in response to a signal from the home server. When the user selects via cellular phone an area, a state or a type of the devices to, the home server creates an image of the current state information showing the state of the devices for transmitting to the cellular phone.

20 Claims, 19 Drawing Sheets

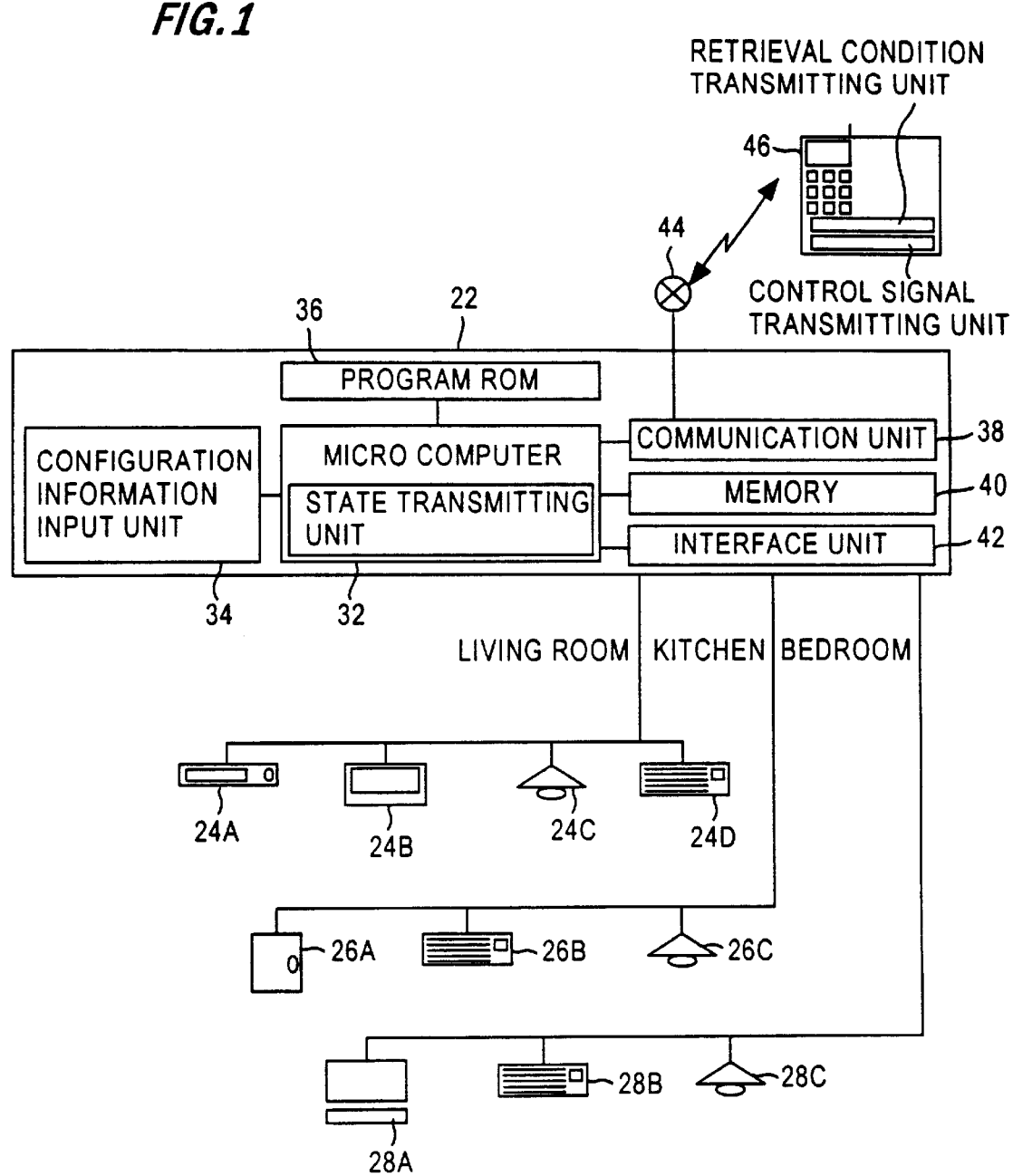

FIG.2

| INSTALLATION AREA | TYPE OF DEVICE | POWER | STATE |
|---|---|---|---|
| LIVING ROOM | VCR | OFF | NO TIMER SET FOR RECORDING |
| | TV | OFF | |
| | LIGHTING | ON | |
| | AIR CONDITIONER | OFF | NO TIMER SET, OPERATION START TIME 0 : 00, OPERATION TEMPERATURE 26°C, HIGH |
| | SECURITY SYSTEM | ON | |
| KITCHEN | AIR CONDITIONER | OFF | NO TIMER SET |
| | LIGHTING | ON | |
| BEDROOM | PC | OFF | |
| | AIR CONDITIONER | OFF | TIMER SET (TURN ON AT 18 : 00, SET TEMPERATURE 28°C) |
| | LIGHTING | ON | |
| CHILDREN'S ROOM | LIGHTING | OFF | |
| DINING ROOM | LIGHTING 1 | OFF | |
| | LIGHTING 2 | OFF | |
| | LIGHTING 3 | ON | |

HOME ELECTRONICS SYSTEM ENABLING DISPLAY OF STATE OF CONTROLLED DEVICES IN VARIOUS MANNERS

TITLE OF THE INVENTION

Home Electronics System Enabling Display of State of Controlled Devices in Various Manners.

BACKGROUND OF THE INVENTION

1. Field of the Invention

The present invention relates to a home electronics system, and in particular to a home electronics system enabling display of a state of a controlled (target) device of user's interest with a simple operation.

2. Description of the Background Art

A home server is known as an apparatus for remotely controlling devices such as a video cassette recorder (hereinafter referred to as "VCR") located in a household. The home server receives an instruction through a telephone set connected thereto via a public line to remotely control the target devices connected to the home server.

Some of the home servers may have a display connected thereto displaying the state of the controlled devices for a user to check the state of the devices.

When the home server displays the state of the controlled devices, however, the server can display the controlled devices connected thereto only in order, so that numerous operations may be required until the user reaches the controlled device of interest. In addition, this home server cannot make a display in compliance with the resolution of the display screen of a control terminal device or with the file format operable by the control terminal device. Therefore, it is impossible for the home server to be connected for use with various kinds of control terminal devices having different specifications.

It has thus been difficult, in the past, to simultaneously grasp the state of the controlled devices desired by the user, and to rapidly operate the controlled devices.

SUMMARY OF THE INVENTION

The present invention is directed to solve the problems described above, and an object of the invention is to provide a home electronics system in which a user can rapidly perform the remote operation of a controlled device.

Another object of the invention is to provide a home electronics system that can display a state of the controlled device with various resolutions.

A further object of the invention is to provide a home electronics system that can be used with a plurality of types of control terminal devices connected thereto.

A home electronics system according to one aspect of the present invention includes a control terminal device having a display function, a home server connected to the control terminal device via a communication network, and a controlled device connected to the home server for operating in response to a control signal. The control terminal device includes a retrieval condition transmitting unit for transmitting a retrieval condition for the controlled device, a display connected to the home server for displaying a state of the controlled device in response to data received from the home server, and a control signal transmitting unit for transmitting a control signal controlling the target device. The home server includes a state transmitting unit connected to the retrieval condition transmitting unit to create data indicating the state of the controlled device matching with the retrieval condition for transmitting to the control terminal device, and a device controlling unit connected to the control signal transmitting unit and the controlled device for controlling the target device in response to the control signal received from the control signal transmitting unit.

The controlled device matching with the retrieval condition transmitted by the control terminal device is selected and the state of the selected controlled device is displayed on the control terminal device. Thus, the user can rapidly obtain information on the desired controlled device and simultaneously and rapidly perform remote control of a plurality of controlled devices.

Preferably, the retrieval condition transmitting unit transmits a type condition of the controlled device. The condition transmitting unit creates data indicating the state of the controlled device matching with the type condition received, for transmitting to the control terminal device.

For example, when lighting is selected as a type of the controlled device, the state of all the lighting equipment in a house can be seen, so that a light inadvertently left on can be easily found. Thus, the user can rapidly obtain the information on the desired controlled device and simultaneously and rapidly perform the remote operation of a plurality of controlled devices.

More preferably, the retrieval condition transmitting unit transmits a state condition of the controlled device, and the condition transmitting unit creates data indicating the controlled device matching with the received state condition, for transmitting to the control terminal device.

For example, when the power "ON" is selected as a state of the controlled device, controlled devices indicating power can be easily found among the controlled devices in the whole house. Thus, the user can rapidly find any controlled device with the power left "on" and simultaneously and rapidly perform the remote control of these controlled devices.

More preferably, the home server further includes an icon memory unit for storing the icon of the controlled device. The state transmitting unit creates data including the icon and the state of the controlled device matching with the retrieval condition for transmitting to the control terminal device.

The data indicating the controlled devices with icons is created on the server side. Thus, the user can recognize the controlled device at a glance and a rapid remote operation is enabled.

More preferably, the control terminal device further includes a format-transmitting unit for transmitting a format of data received by the display. The state transmitting unit receives the format from the format-transmitting unit to transmit data in compliance with the format to the control terminal device.

The data of a format displayable in the control terminal device is transmitted by the home server. Thus, the user can remotely control the target device from various types of control terminal devices.

More preferably, the control terminal device further includes a resolution-transmitting unit for transmitting a resolution of data displayed on the display. The state transmitting unit receives the resolution from the resolution-transmitting unit and creates data having the resolution for transmitting to the control terminal device.

The data in compliance with the resolution of the display of the control terminal device is transmitted by the home server. Thus, the user can remotely control the target device from various types of control terminal devices such as a cellular phone or a personal computer.

The home server according to another aspect of the present invention is connected to the control terminal device having a display function as well as to a controlled device operating in response to a control signal. The home server includes a state transmitting unit connected to the control terminal device to create data indicating a state of the controlled device matching with a retrieval condition received from the control terminal device, for transmitting to the control terminal device, and a device control unit connected to the control terminal device and the controlled device for controlling the target device.

The controlled device matching with the retrieval condition transmitted by the control terminal device is selected, and the state of the selected controlled device is displayed on the control terminal device. Thus, the user can rapidly obtain the information on the desired controlled device and can simultaneously and rapidly perform remote control of a plurality of controlled devices.

In a computer readable recording medium according to a further aspect of the present invention, a program for a computer to perform as a home server is recorded. The home server is used in a home electronics system including a control terminal device having a display function, a home server connected to the control terminal device via a communication network, and a controlled device connected to the home server for operating in response to a control signal. The home server includes a state transmitting unit connected to the control terminal device to create data indicating the state of the controlled device matching with a retrieval condition received from the control terminal device, for transmitting to the control terminal device, and a device controlling unit connected to the control terminal device and the controlled device for controlling the target device in response to a control signal received from the control terminal device.

The controlled device matching with the retrieval condition transmitted by the control terminal device is selected, and the state of the selected controlled device is displayed on the control terminal device. Thus, the user can rapidly obtain the information on the desired controlled device and simultaneously and rapidly perform remote control of a plurality of controlled devices.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an arrangement of a home electronics system of the first embodiment of the present invention;

FIG. 2 shows an example of a device information table;

DESCRIPTION OF THE PREFERRED EMBODIMENTS

First Embodiment

Figure 3:
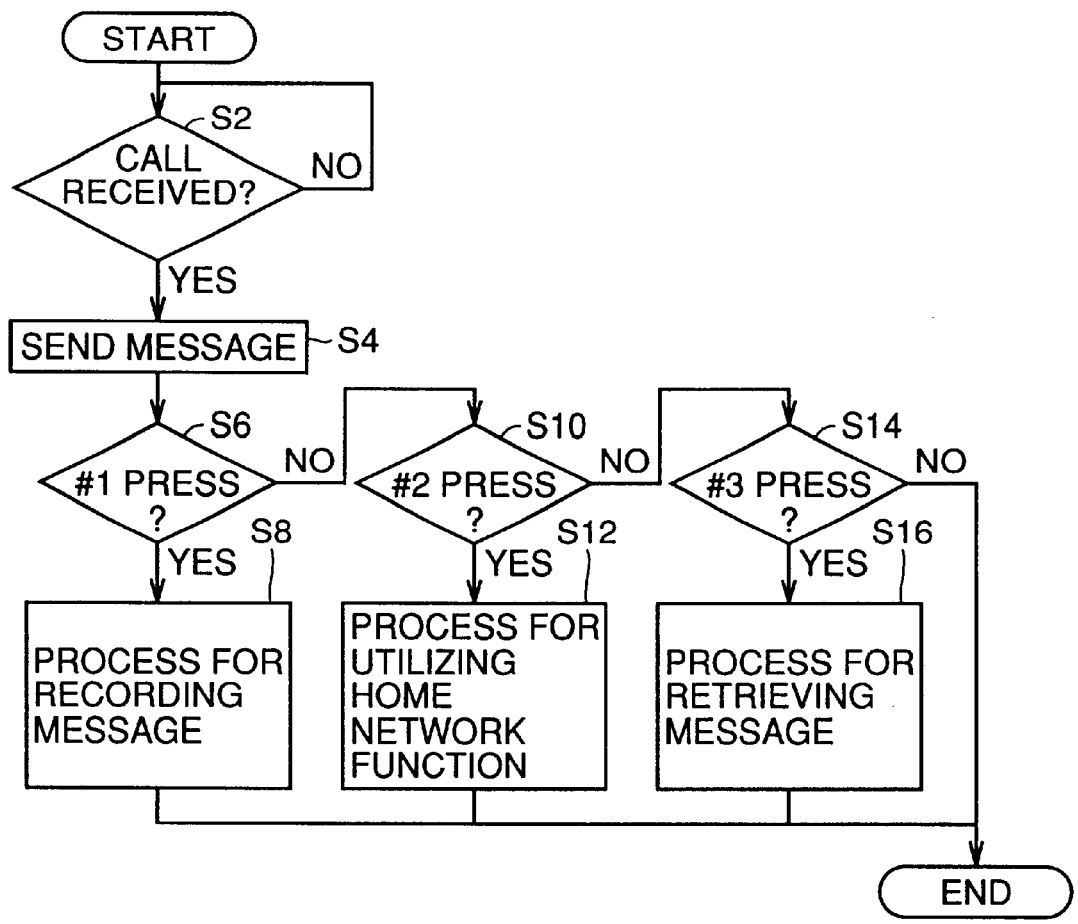
FIG. 3 is a flowchart showing a process executed by a home server.

Referring to FIG. 1, a home electronics system according to the first embodiment of the present invention includes a home server 22, a cellular phone 46 connected to home server 22 via a public line network 44, and devices for control 24A to 28C controlled in response to a signal from home server 22.

Home server 22 includes a communication unit 38 connected to a public line network 44, an interface unit 42 connected to devices 24A to 28C for transmitting and receiving data to/from devices 24A–28C, a memory 40 for storing information concerning the installation area or the state of devices 24A to 28C, a program ROM (Read Only Memory) 36 storing a program of remote control process of devices 24A to 28C, a configuration information input unit 34 for a user to input information concerning a change of the configuration of the devices in such a case that the installation area is changed or a device is added, and a microcomputer 32 connected to configuration information input unit 34, program ROM 36, communication unit 38, memory 40 and interface unit 42 for controlling these units.

Microcomputer 32 includes a state transmitting unit (not shown) creating data indicating the state of devices 24A to 28C and transmitting to cellular phone 46, and a device control unit (not shown) for controlling devices 24A to 28C.

Communication unit 38 includes, for example, a communication modem or the like. Configuration information input unit 34 includes, for example, LCD (Liquid Crystal Display) with a touch panel or the like.

Devices 24A to 28C are classified by each area (a living room, a kitchen and a bedroom) of a house in which home server 22 is installed. In the living room, a VCR 24A, a television (hereinafter referred to as TV) 24B, a lighting equipment 24C and an air conditioner 24D are installed. In the kitchen, a security system 26A, an air conditioner 26B and a lighting equipment 26C are installed. In the bedroom, a personal computer 28A, an air conditioner 28B and a lighting equipment 28C are installed.

The information on the installation area or the state of these devices is stored in memory 40 of home server 22 as a device information table.

Referring to FIG. 2, an example of the device information table is described. In the device information table, the installed devices are classified by each installation area and stored. Each device information includes a type, a power state and the other additional states of the device. For example, it can be seen from the device information table shown in FIG. 2 that the power state of the VCR installed in the living room is "OFF" and the timer on the VCR is not set for recording.

Icon data is further stored in memory 40 for graphical representation of the devices by their types.

A process for operating the devices by home server 22 is described with reference to FIGS. 3 and 4A and 4B.

Referring to FIG. 3, home server 22 waits until it receives a call from outside (S2). The process described herein assumes that the server receives a call from cellular phone 46. When a call is received (YES in S2), microcomputer 32 sends a voice message of operation information that is pre-recorded and stored in memory 40 to cellular phone 46 connected upon the call. Microcomputer 32 would send a voice message such as "Hello. This is XX's home server. For recording a message, press #1. For listening to a message, press #3. If you wish to use the home network system, press #2."

Home server 22 waits until any button is pressed in response to the voice message on cellular phone 46. When the button operation using cellular phone 46 is performed, microcomputer 32 determines which button was pressed (S6, S10 and S14). If "#1" is pressed (YES in S6), the process for recording a voice message is executed (S8). If "#2" is pressed (NO in S6 and YES in S10), the process for operating the subsequently described devices connected to home server 22 is executed (S12). If "#3" is pressed (NO in S6, NO in S10 and YES in S14), the process for reproducing the prerecorded voice message is executed (S16). If the other buttons are pressed (NO in S6, NO in S10 and NO in S14), the device operation process is terminated without any process execution.

Figure 4A:
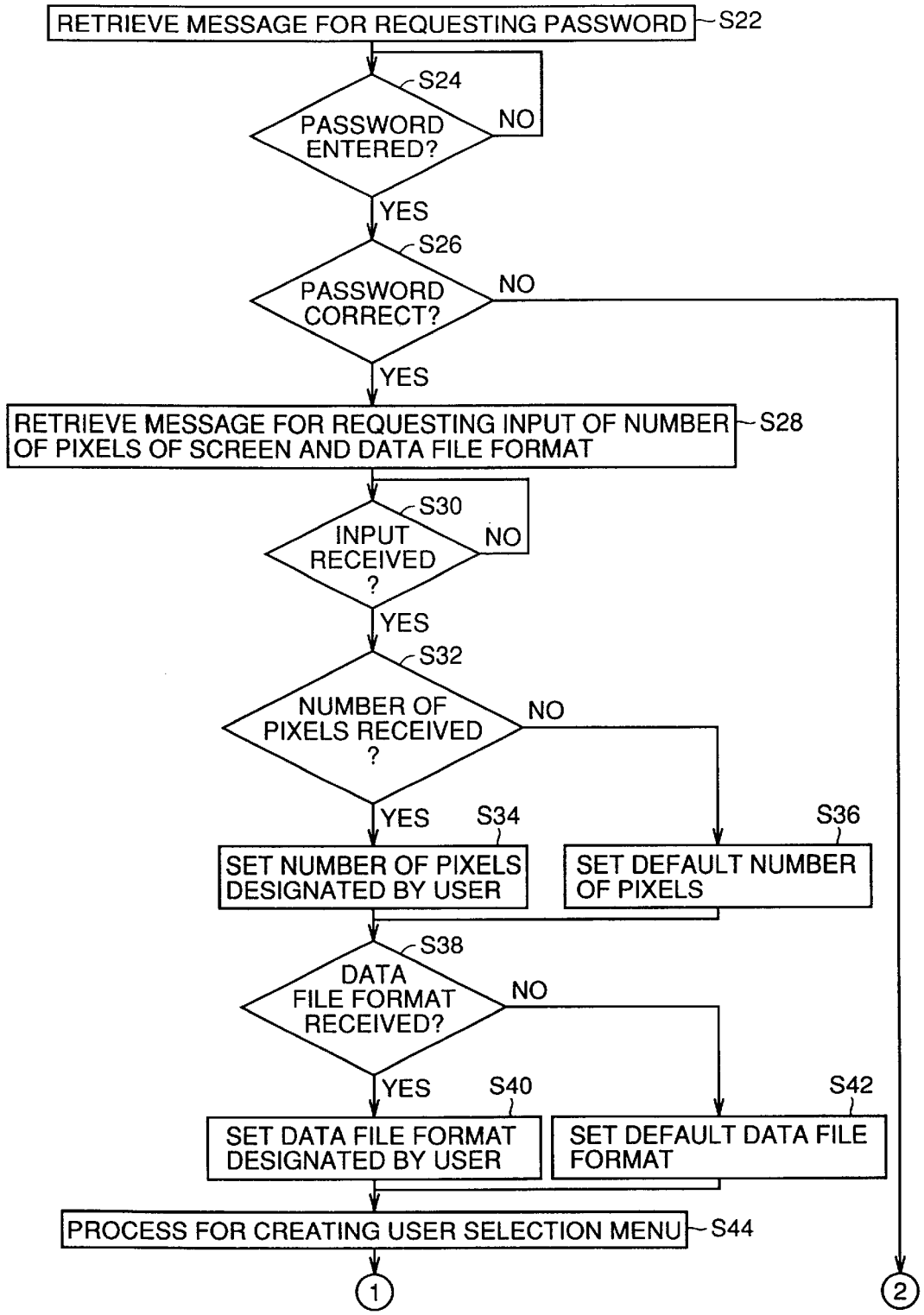
FIGS. 4A and 4B are flowcharts showing a device operation process by a home server.
Figure 4B:
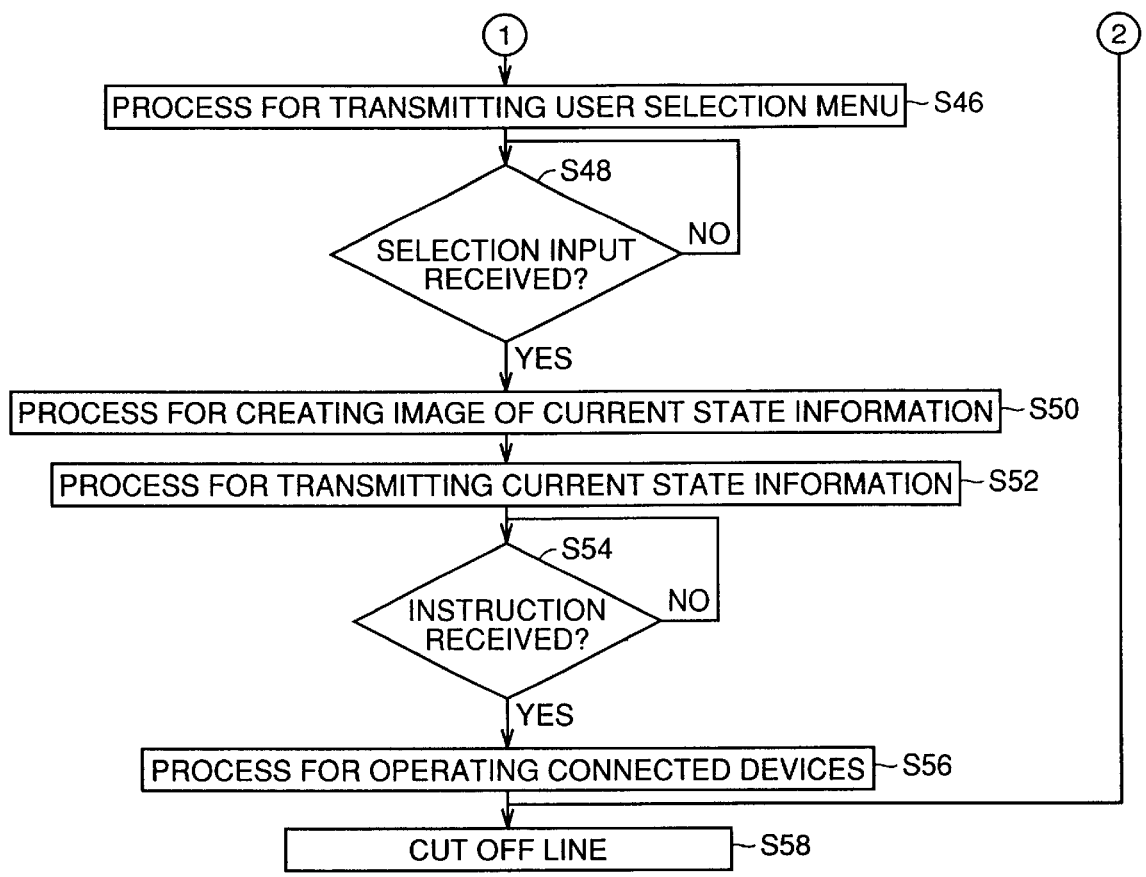

Referring to FIGS. 4A and 4B, the process of S12 in FIG. 3 is described in detail.

Microcomputer 32 sends a voice message requiring the password, pre-recorded and stored in memory 40, to cellular phone 46 (S22). For example, microcomputer would send the voice message such as "please enter the password".

Microcomputer 32 waits until the user enters the password in response to the message (S24). When the password is entered (YES in S24), microcomputer 32 compares the entered password with the one pre-stored in memory 40 (S26). If the entered password is incorrect (NO in S26), the line connection is cut without executing any further process (S58).

If the entered password is correct (YES in S26), microcomputer 32 notifies that the access has been accepted, and sends the message to cellular phone 46 asking to enter the number of pixels for the display thereof and the file format of the data to be transferred thereto (S28). For example, microcomputer 32 sends a message such as: "Your access has been accepted. Please enter the number of pixels for the display screen and the file format of the data to be transferred."

Microcomputer 32 waits until data is input for this message (S30). When the data is input from cellular phone 46 (YES in S30), microcomputer 32 examines whether the data includes information concerning the number of pixels (32S). If it includes the number of pixels (YES in S32), the received number of pixels is set as the number of pixels for the display of cellular phone 46 (S34). If the number of pixels is not included (NO in S32), then the default number of pixels pre-stored in memory 40 is set as the number of pixels of the screen (S36).

Thereafter, microcomputer 32 examines whether information concerning the file format is included in the received data (S38). If the file format is included (YES in S38), the received file format is set as a file format for data transmission (S40). If the file format is not included (NO in S38), the default file format pre-stored in memory 40 is set as the file format for data transmission (S42).

For example, if the user enters "320×240" as the number of pixels for the display of cellular phone 46 and "XML (extensible Markup Language)" as the file format, these information are sent to home server 22 and are set as the number of pixels for the screen and the file format of the transmitting data.

Figure 5:
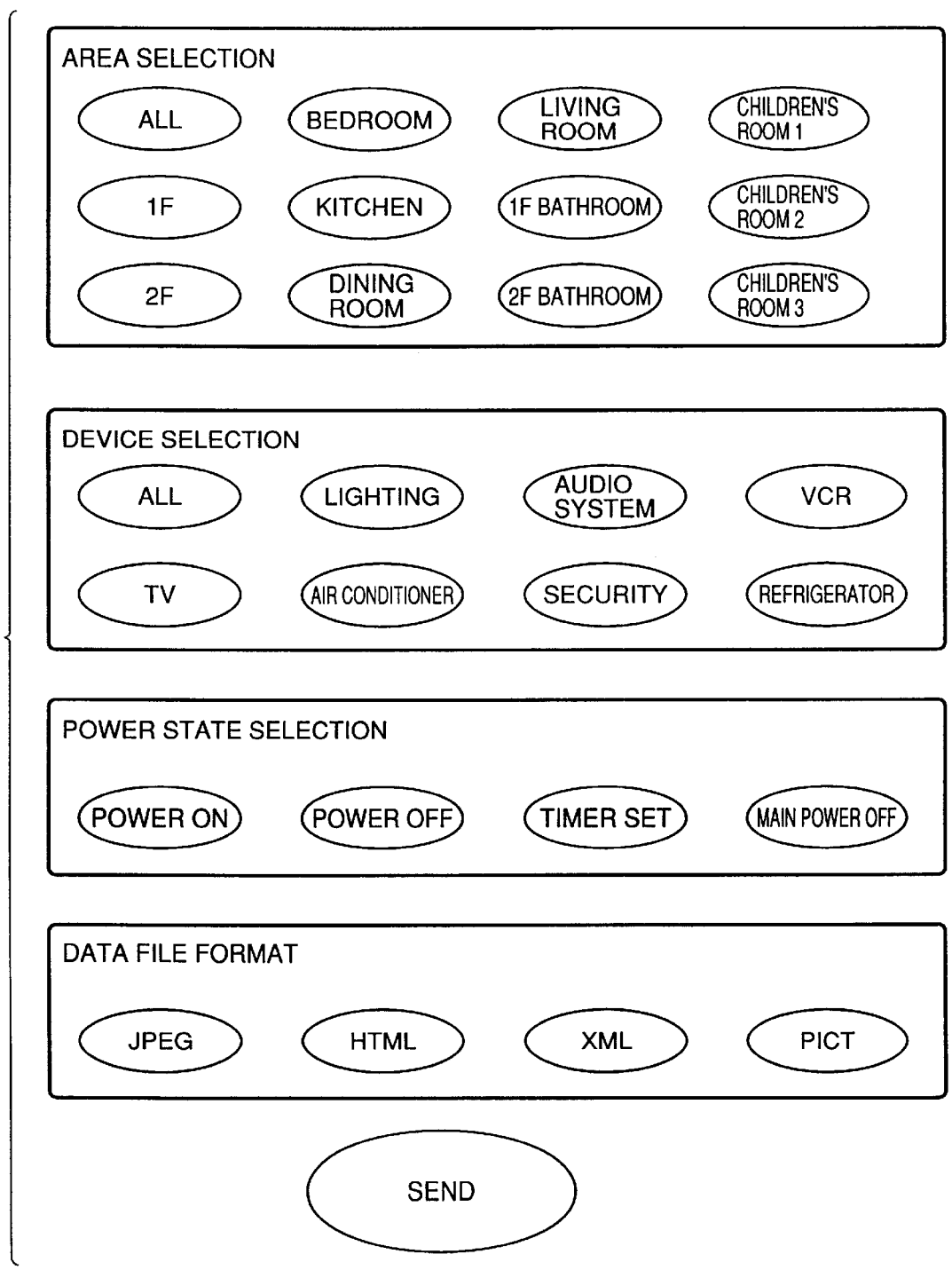
FIG. 5 is an example of a display showing a user selection menu.

Microcomputer 32 enlarges or reduces the display of the user selection menu as shown in FIG. 5 pre-stored in memory 40, to conform to the set number of pixels.

The user selection menu includes an area selection box in which buttons for selecting an area such as the living room, the kitchen or the bedroom are arranged, a device selecting box in which buttons for selecting a device such as the lighting equipment, the VCR or the TV are arranged, a power state selection box in which buttons for selecting a power state of a controlled device such as power "ON" or power "OFF" are arranged, and a data file format selection box in which buttons for selecting a file format such as JPEG (Joint Photographic Experts Group) or HTML (HyperText Markup Language) are arranged.

Microcomputer 32 converts the file format of the user selection menu to the set file format, and subsequently sends the converted user selection menu to cellular phone 46 via communication unit 38 (S46).

Figure 6:
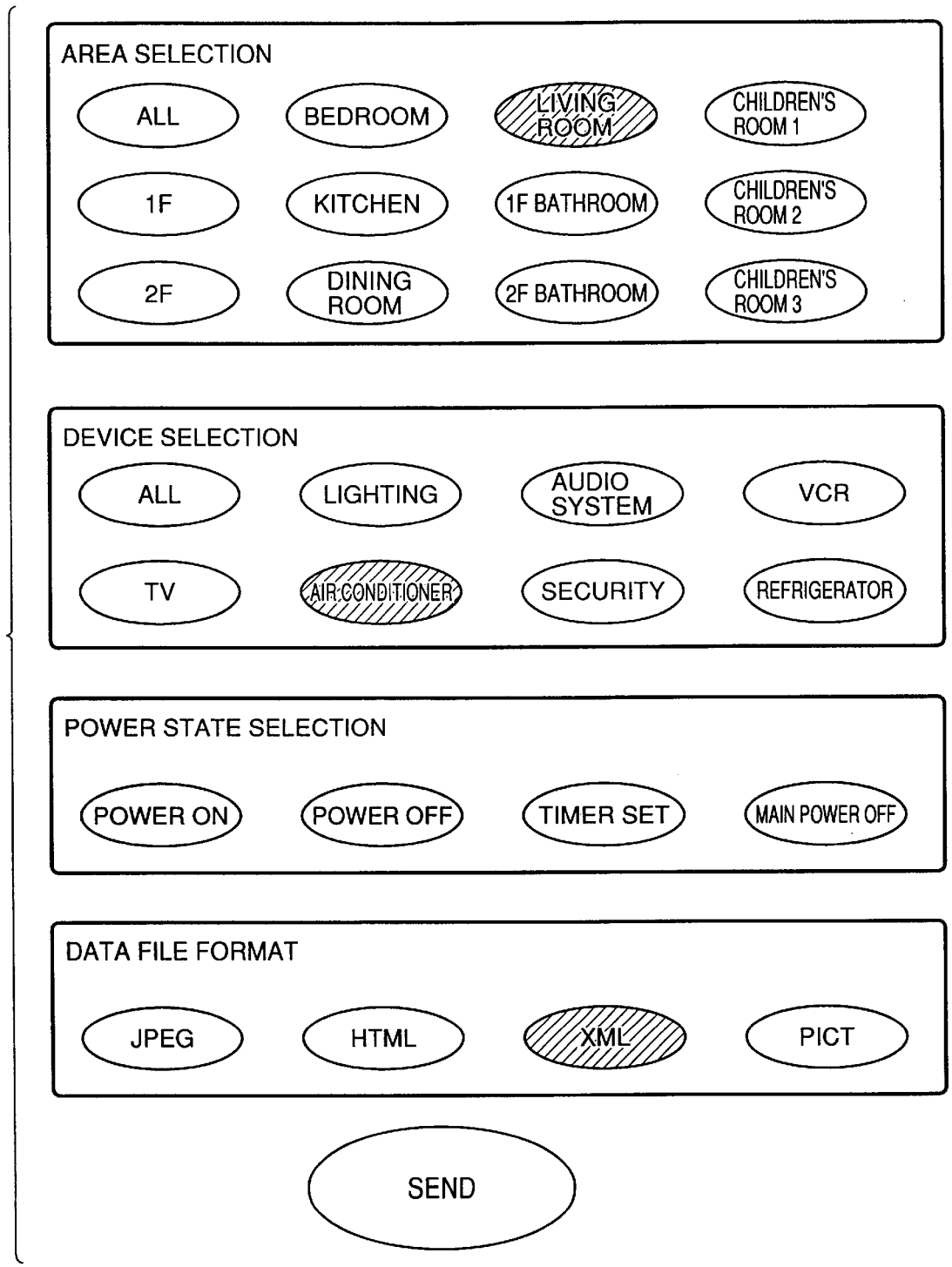
FIG. 6 is an example of the display showing the user selection menu after selection.

Cellular phone 46 displays the received user selection menu on the display. Microcomputer 32 waits until it receives the selections entered by the user according to the user selection menu displayed on the display of cellular phone 46 (S48). Referring to FIG. 6, for example, assume that the user has made a selection to receive the information concerning the state of air conditioner 24D in the living room in XML format. In this case, three selections of "living room", "air conditioner" and "XML" are sent to home server 22 from cellular phone 46.

Figure 7:
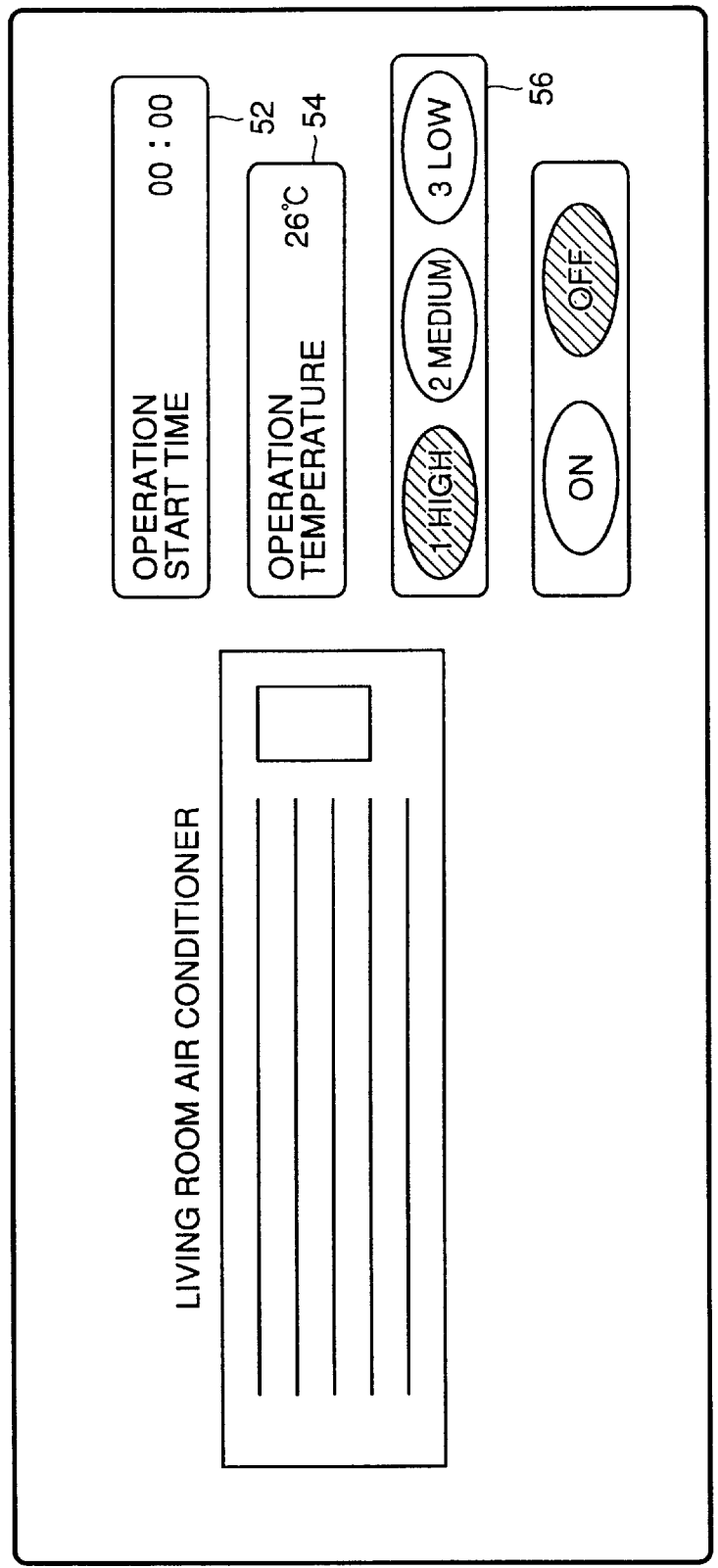
FIGS. 7 and 8 are examples of the display showing current state information.

When communication unit 38 received the user selections (YES in S48), microcomputer 32 would read out the necessary information from the device information table shown in FIG. 2 according to the received selections to create an image of the current state information (S50). For example, in the above-described embodiment, the information concerning air conditioner 24D in the living room is read out from the device information table for creating the image of the current state information as shown in FIG. 7. The image of the current state information is enlarged or reduced such that its number of pixels conforms to the number of pixels set in S34 or S36, that is, the one used to create the user selection menu. The state of air conditioner 24D in the living room is displayed in the current state information, which indicates "the air conditioner turns on at 00:00, the operating temperature is 26° C., the wind level is set high, and the current state of the power is OFF."

Microcomputer 32 converts the image of the current state information to the file format designated in S48, and subsequently sends it to cellular phone 46 via communication unit 38 (S52). If the file format is not designated in S48, microcomputer 32 converts the file format according to the same file format as the one designated in S40 or S42.

Figure 8:
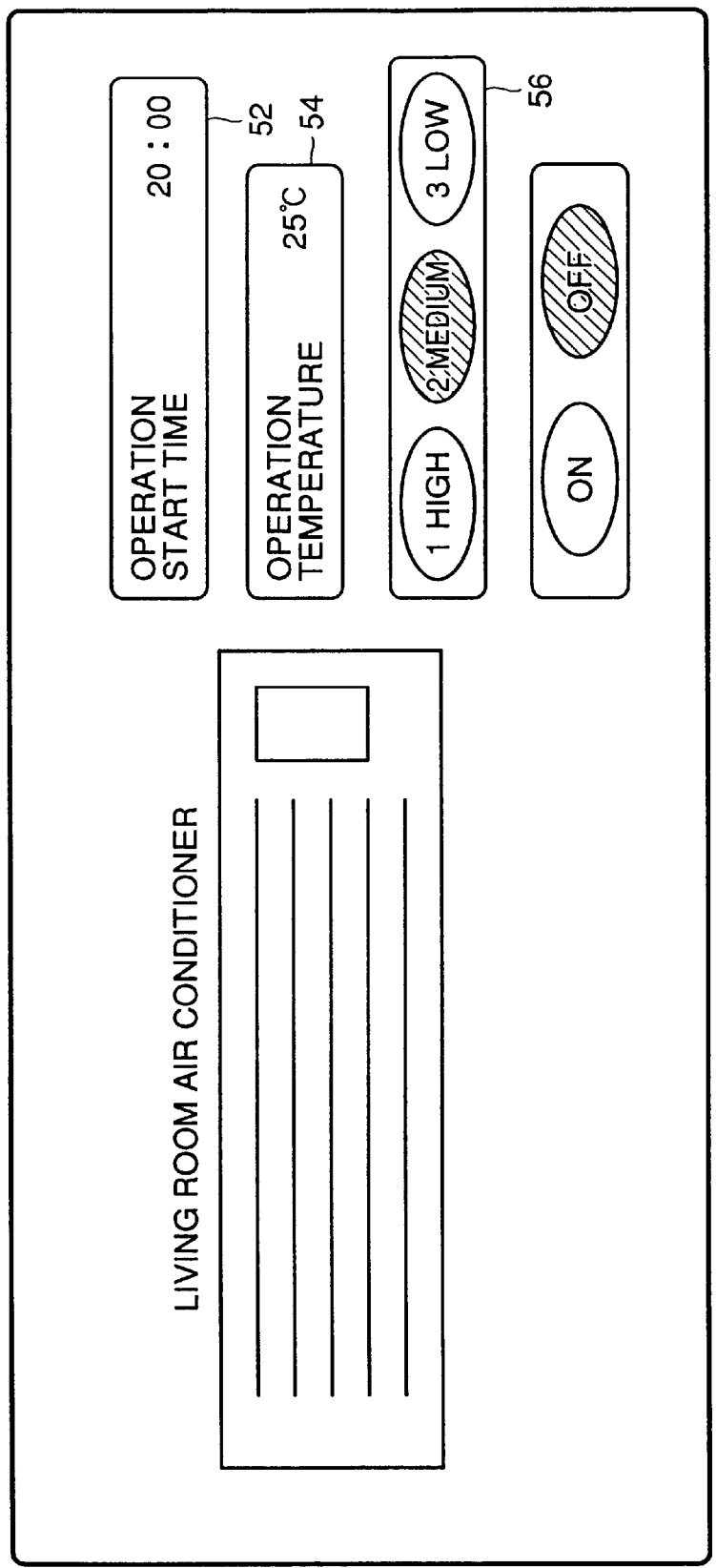

The current state information is displayed on the display of cellular phone 46. The user operates the cursor key of cellular phone 46 while looking at the displayed current state information to set the state of air conditioner 24D. For example, to turn on the air conditioner in the living room at 20:00 for operating at medium wind level, the operation as described below is performed. Referring to FIG. 8, the user brings the cursor onto the icon of air conditioner 24D and clicks the icon. Next, in order to set the operation start time, cursor is moved onto a box 52 and "2000" is entered. Likewise, the user moves the cursor onto a box 54 to enter "25" and then onto a box 56 to select "2 medium".

Microcomputer 32 waits until it receives the entered or selected instruction (S54). If the instruction is received (YES in S54), microcomputer 32 operates the controlled device according to the instruction (S56). For example, in the embodiment described above, timer-setting process is executed for turning on air conditioner 24D in the living room at 20:00 to operate at the medium wind level.

Thereafter, configuration information input unit 34 cut off the telephone connection (S58) and terminates the process in S12 shown in FIG. 3.

Though the remote control of the devices connected to home server 22 via cellular phone 46 was described in the example above, a personal computer or the like may be used in place of cellular phone 46 to remotely control the devices connected to home server 22.

[First Alternative Example of Remote Control of Devices]

Figure 9:
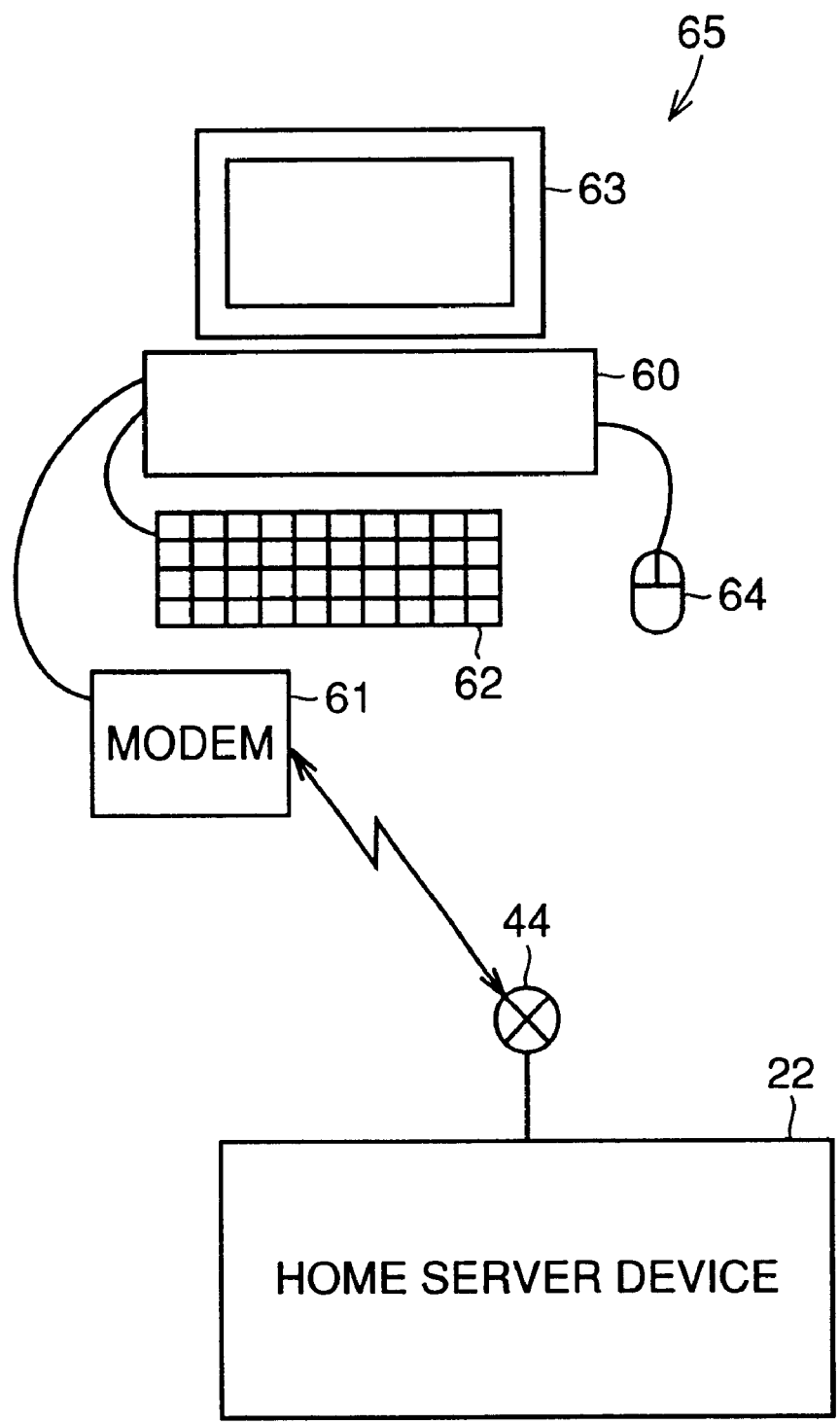
FIG. 9 shows a state of the home electronics system in which a personal computer system is used.

An example of remotely controlling the VCR in the living room by a personal computer system 65 is described with reference to FIG. 9.

Personal computer system 65 includes a personal computer 60, and a display 63, a keyboard 62, a mouse 64 and a modem 61 respectively connected to personal computer 60. Modem 61 is connected to home server 22 via a public line network 44.

In response to the process of S28 in FIG. 4A, assume that the user has entered 1024×768 as the number of displayable pixels for display 63 and HTML as the file format. Referring to FIG. 5, the user selection menu is converted to the HTML file format and subsequently sent to personal computer system 65 (S46). Personal computer system 65 displays the received user selection menu of HTML format on display 63.

Figure 10:
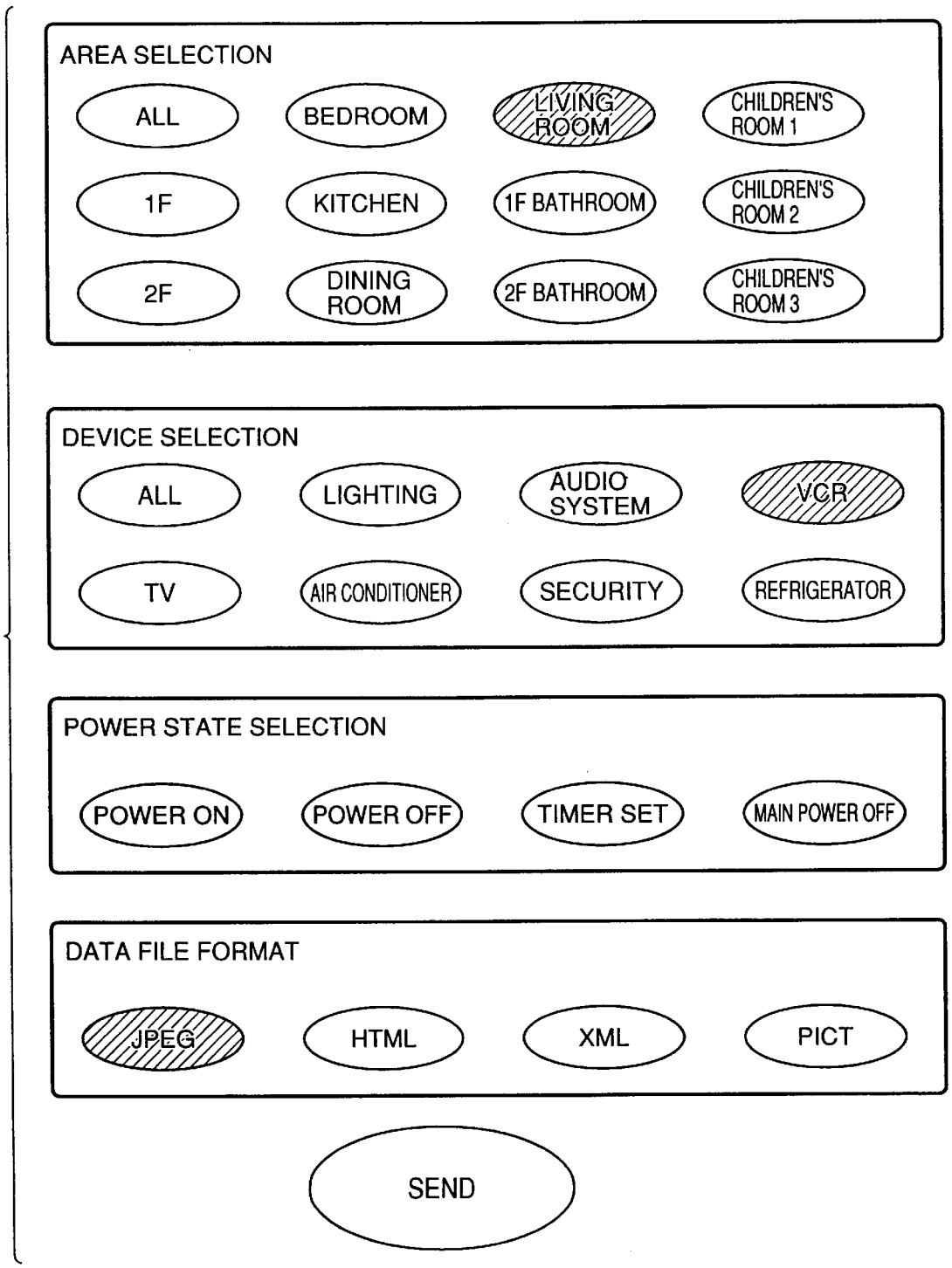
FIG. 10 is an example of the display showing the user selection menu after the selection.

Referring to FIG. 10, the user selects the required mode according to the user selection menu displayed on display 63. Here, in order to receive the information concerning the state of VCR 24A in the living room in JPEG format, the user presses the buttons denoted as "living room" "VCR" and "JPEG", and then presses the "send" button. By pressing the "send" button, the three selected conditions are transmitted from personal computer system 65 to home server 22.

Figure 11:
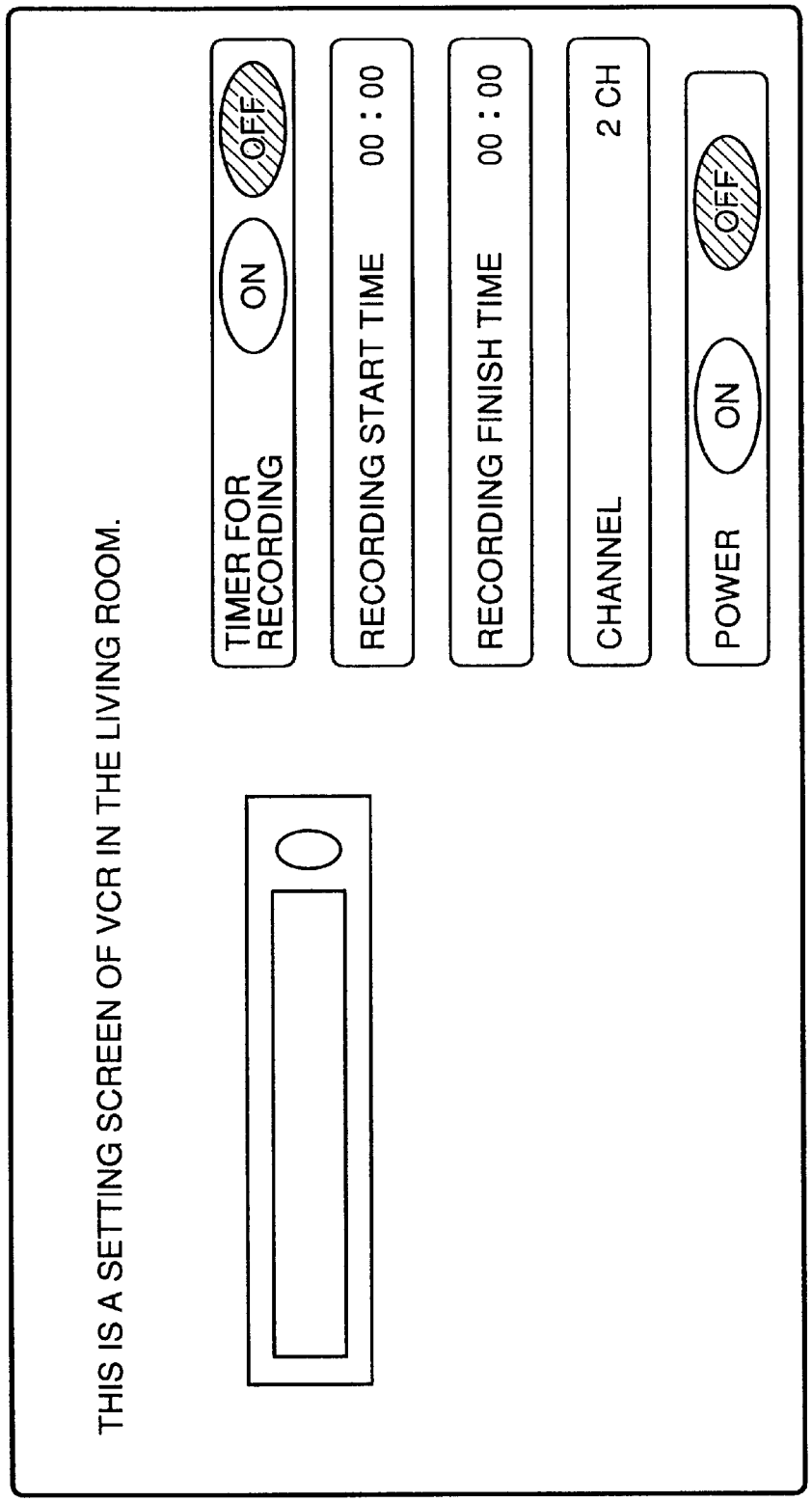
FIGS. 11 and 12 are examples of the display showing the current state information.

When communication unit 38 receives the selection input (YES in S48), microcomputer 32 reads out the necessary information from the device information table shown in FIG. 2 according to the received selection to create the image of the current state information of 1024×768 pixel as shown in FIG. 11 (S50). In the current state information, the state of VCR 24A in the living room is displayed. This state information shows that the timer of VCR 24A is not set for recording and the current state of the power is OFF.

The created image of the current state information is compressed into JPEG format and is sent to personal computer system 65 (S52).

Figure 12:
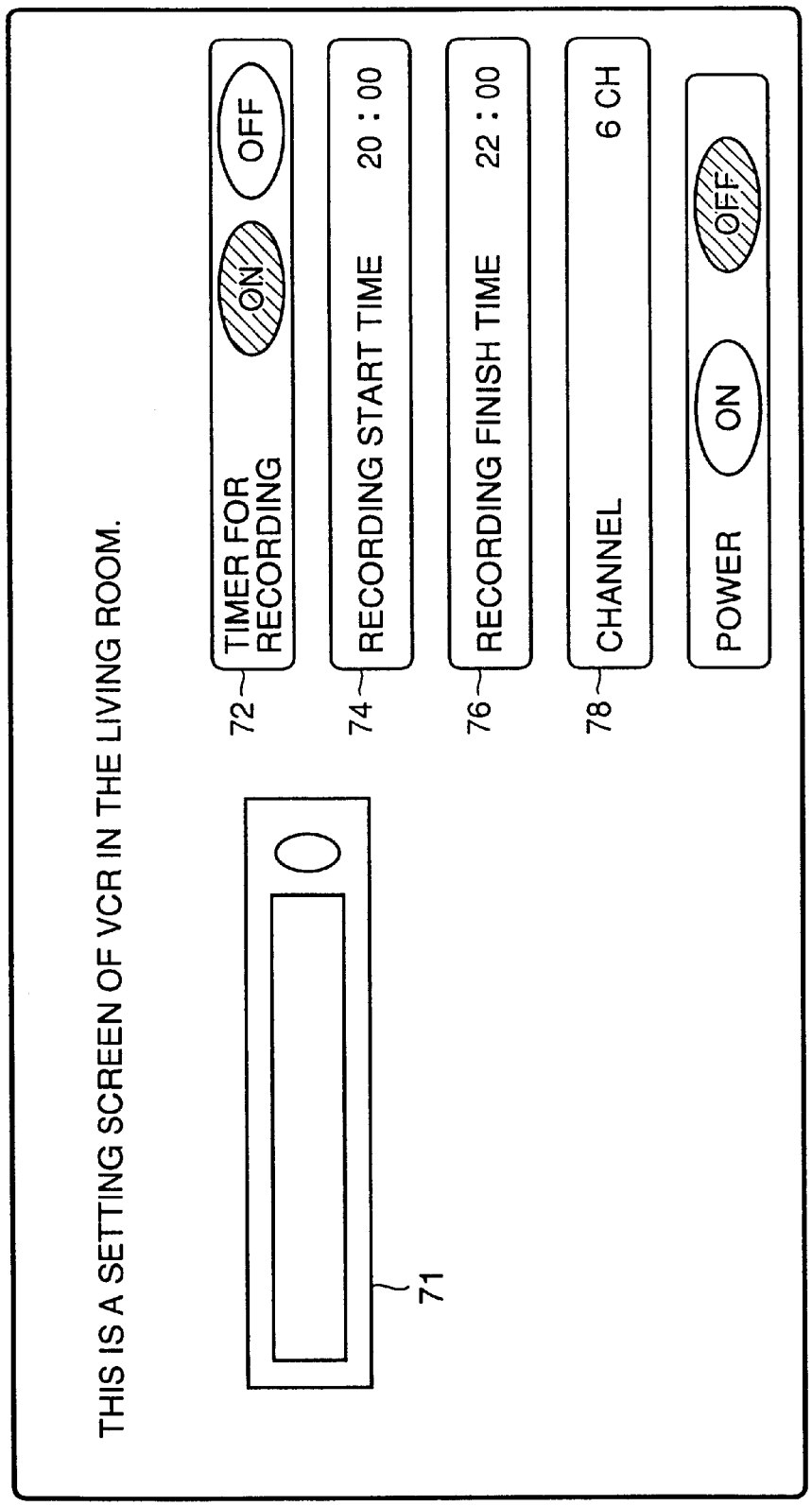

Personal computer 60 receives the JPEG-compressed image of the current state information via modem 61 and extracts the image to be subsequently displayed on display 63. The user operates keyboard 62 or mouse 64 while looking at the displayed current state information to set the state of VCR 24A. For example, to record the TV program on channel 6 for 2 hours from 20:00, the operation performed is as follows. Referring to FIG. 12, the user moves the cursor onto icon 71 of VCR 24A and clicks the icon. Thereafter, the user moves the cursor onto a box 72 for setting the timer for recording and selects "ON". Further, the user moves the cursor onto a box 74 to set the start time for recording and enters "20:00" using keyboard 62. Likewise, in boxes 76 and 78, "22:00" and "6" are respectively entered to set the finish time for recording and the channel.

Microcomputer 32 receives the entered or selected instruction (YES in S54) and sets the timer of VCR 24A for recording according to the instruction (S56).

[Second Alternative Example of Remote Control of Devices]

Figure 13:
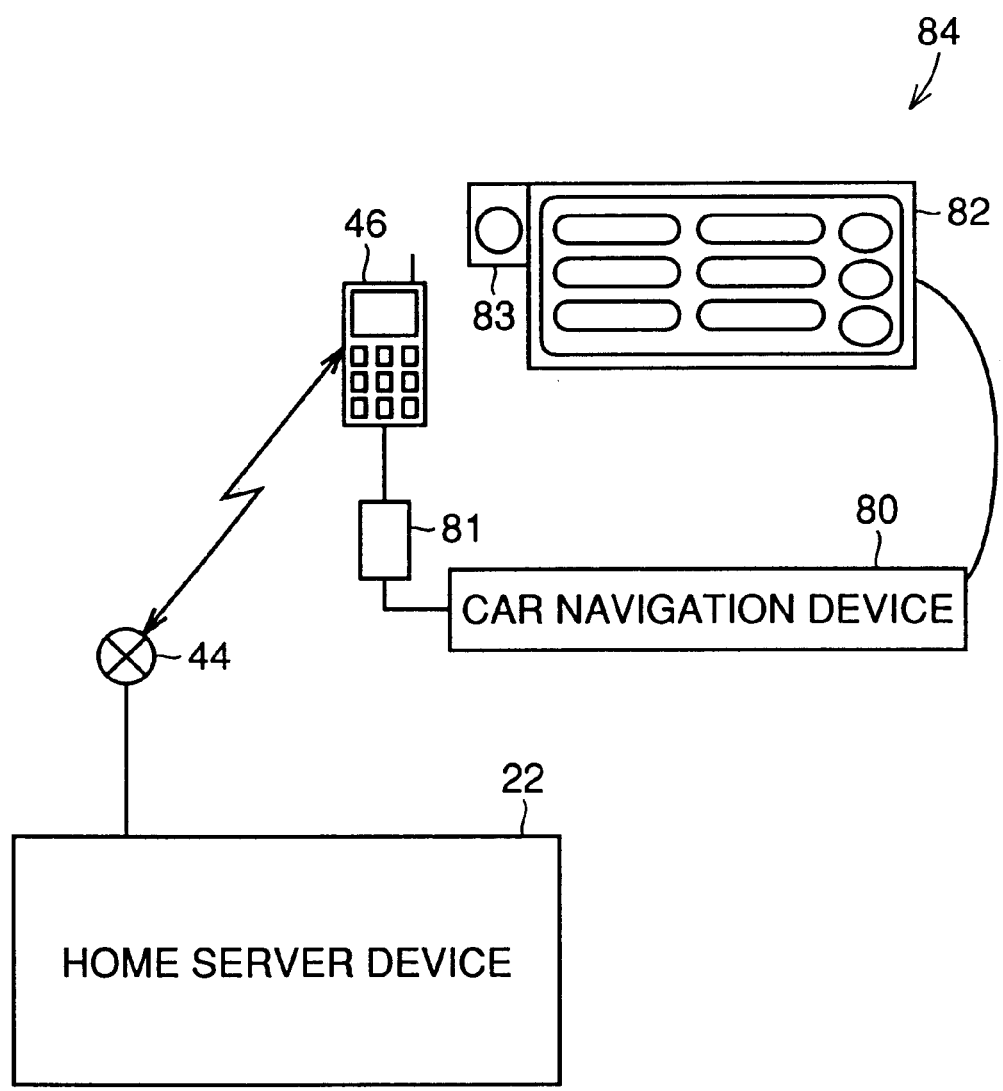
FIG. 13 shows a configuration of a home electronics system in which a car navigation system is used.

Referring to FIG. 13, an example of remotely controlling the lighting in a household using a car navigation system 84 is described.

Car navigation system 84 includes a car navigation device 80, an LCD with touch panel 82 connected to the car navigation device, a built-in speaker 83 connected to the car navigation device, and a cellular phone 46 connected to a cellular phone connecting port 81 of car navigation device 80. Cellular phone 46 is connected to home server 22 via public line network 44.

In response to the process of S28 in FIG. 4A, assume that the user operates the buttons of cellular phone 46 to enter 640×480, which is the display number of pixels of LCD with touch panel 82. The entered number of pixels is set in S34. As to the file format, it is noted that the default file format (HTML for example) is used since the file format is not designated. (S42).

Referring to FIG. 5, the user selection menu of 640×480 pixels is created (S44) and converted to the HTML file format, and then sent to car navigation device 80 (S46). Car navigation device 80 displays the received data in HTML format on LCD with touch panel 82.

Figure 14:
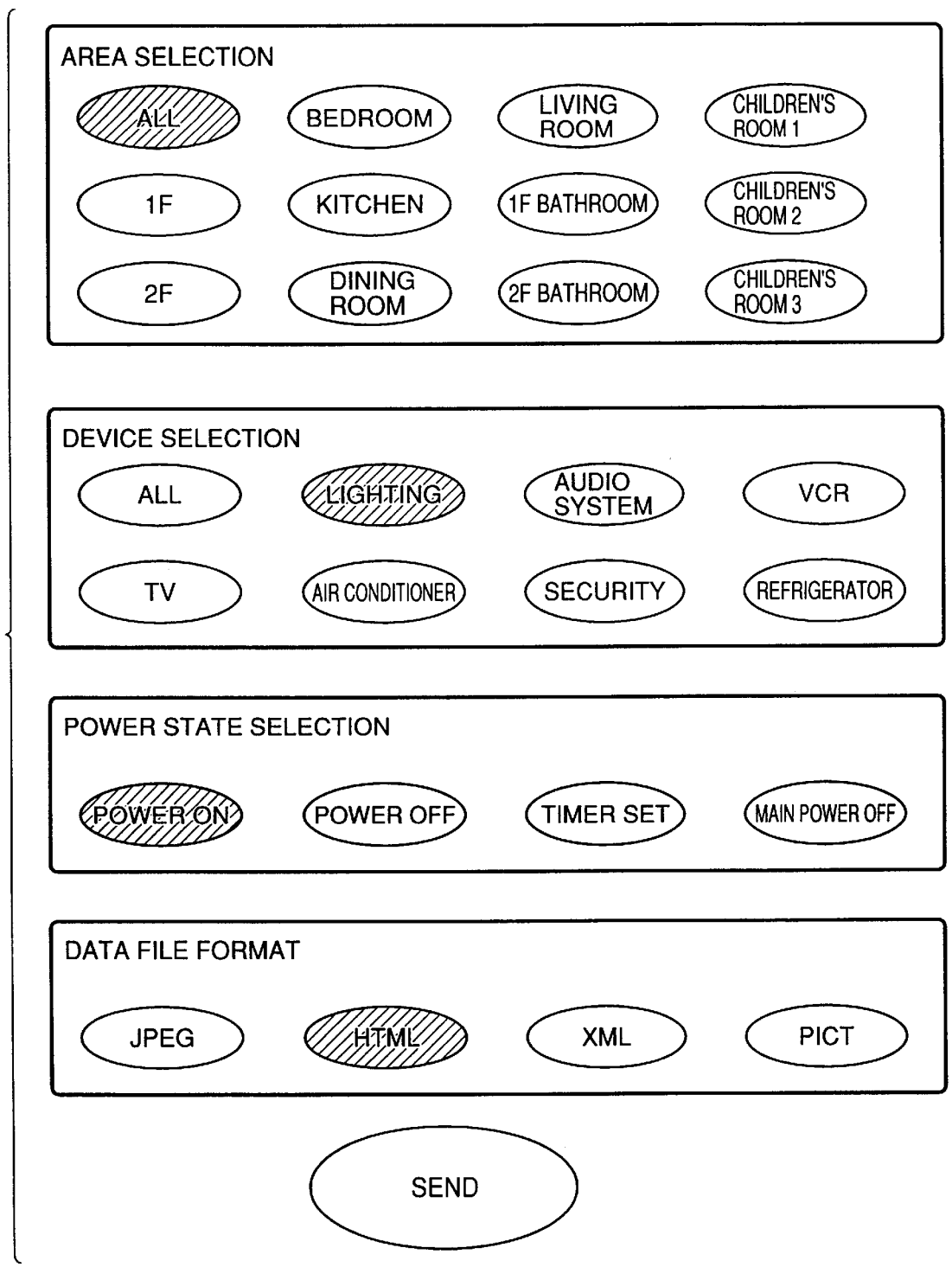
FIG. 14 is an example of the display showing the mode selection menu after selection.

Referring to FIG. 14, the user makes selections of request according to the user selection menu displayed on LCD with touch panel 82. Here, in order to receive the information concerning all the lighting equipment inadvertently left on in all areas of the household, the user presses the buttons denoting "all", "lighting", "power ON" and "HTML", and then presses "send" button. By pressing "send" button, the four selections are transmitted from car navigation device 80 to home server 22 via cellular phone 46.

Figure 15:
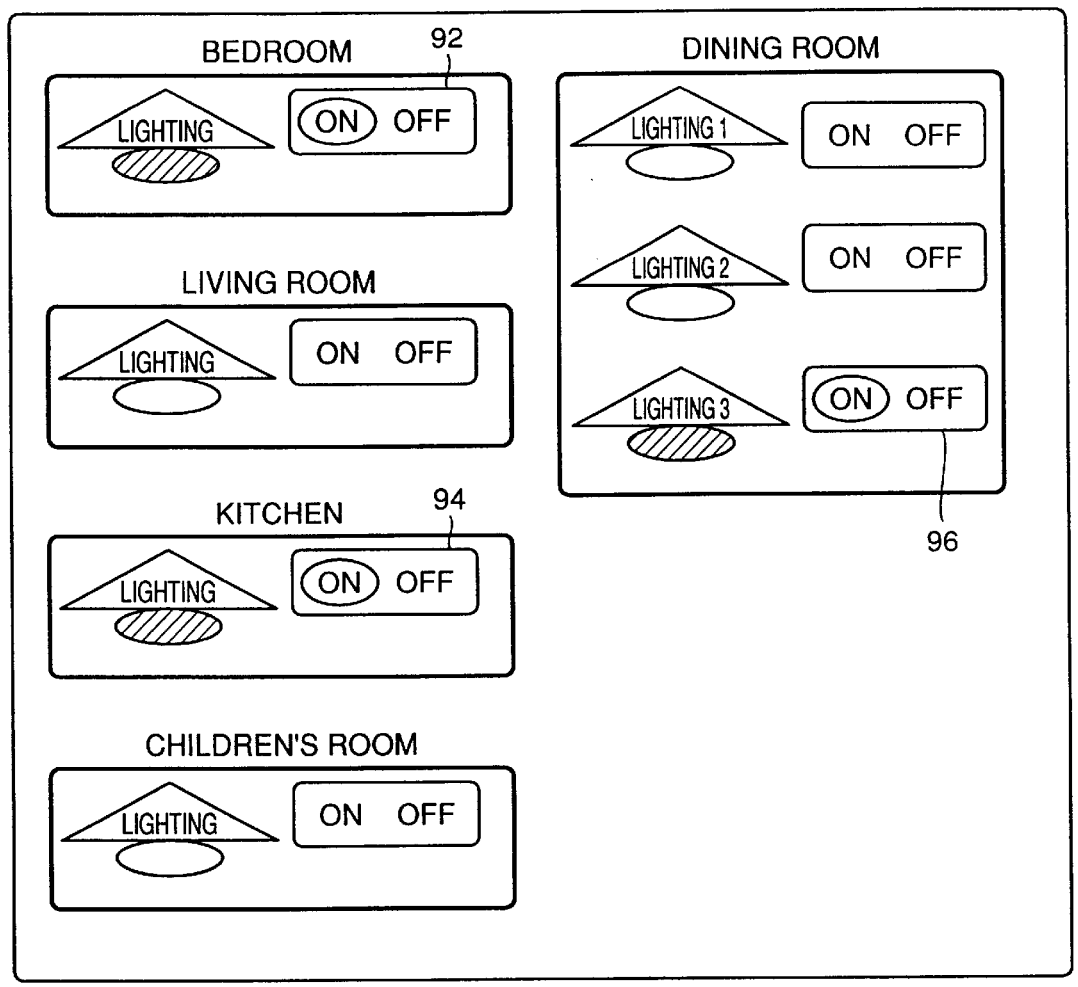
FIG. 15 is an example of the display showing the current state information.

When communication unit 38 receives the selection input (YES in S48), microcomputer 32 reads out the necessary information from the device information table shown in FIG. 2 according to the received selections to create the image of the current state information of 640×480 pixel as shown in FIG. 15 (S50). The image shows icons and boxes indicating the states for each lighting equipment in all areas. The icon of lighting equipment indicating power is displayed differently from the other icons, and the portions denoting "ON" in the boxes are marked by a circle so as to show that the power is ON. From this state information, it can be seen that the lighting equipment in the kitchen and the dining room are left on.

The created image of the current state information is converted to HTML format and then transmitted to cellular phone 46 (S52).

Car navigation device 80 receives the current state information in HTML format via cellular phone 46 for display on LCD with touch panel 82. The user turns off the lighting inadvertently left on while looking at the displayed image of the current state information. That is, the user touches the portions denoted as "OFF" in boxes 92, 94 and 96.

Microcomputer 32 receives the selected instructions (YES in S54) and turns off the lighting which has been inadvertently left on, according to the instruction (S56).

Though, in the example above, the telephone connection is cut after executing the operation of the devices connected to home server 22, it is also possible to send a voice message or a screen for confirming the setting details from home server 22. Further, instead of the parallel arrangement of the icons of the devices to be controlled and their states as shown in FIG. 15, the states may be displayed after clicking the icons of the devices to be controlled.

Moreover, to save the communication cost, line connection may be made only when the data is sent.

According to the home electronics system of the present embodiment as described above, it is possible to remotely control the devices in a household from a control terminal device such as a cellular phone having a display screen, and the states of the devices can be displayed for each of the installation area, the state and the type of the devices. Thus, it is possible for the user to rapidly obtain the information desired, to simultaneously perform remote control of a plurality of devices and to rapidly operate the devices.

Furthermore, the resolution of the display screen and the displayable file format can be designated. Thus, the devices connected to home server 22 can be controlled by a plurality of types of control terminal devices.

Second Embodiment

Figure 16:
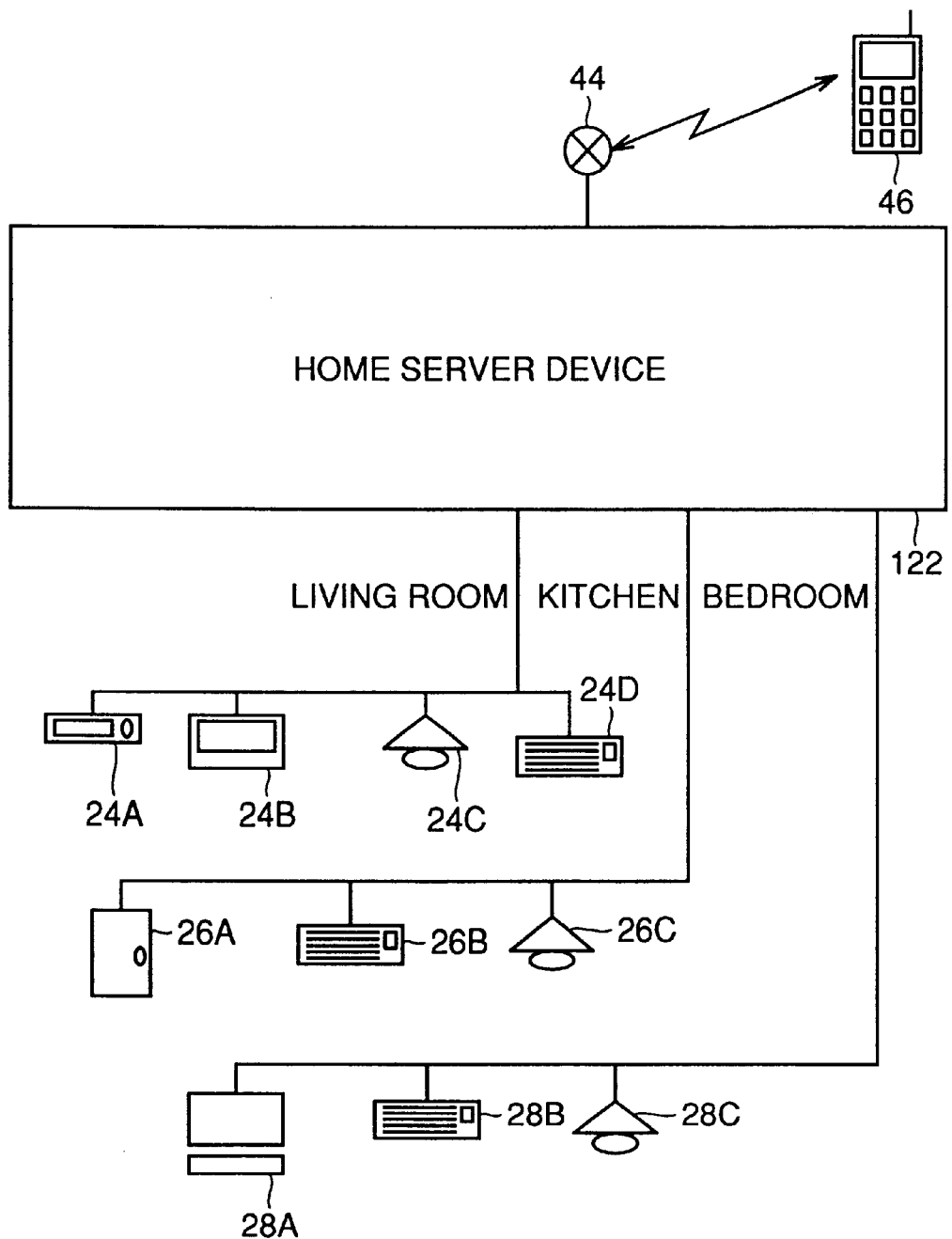
FIG. 16 is a block view of the configuration of the home electronics system according to the second embodiment of the invention.

Referring to FIG. 16, a home electronics system according to the second embodiment of the present invention includes a home server 122, a cellular phone 46 connected to home server 122 via public line network 44 and devices to be controlled 24A to 28C connected to home server 122.

Figure 17:
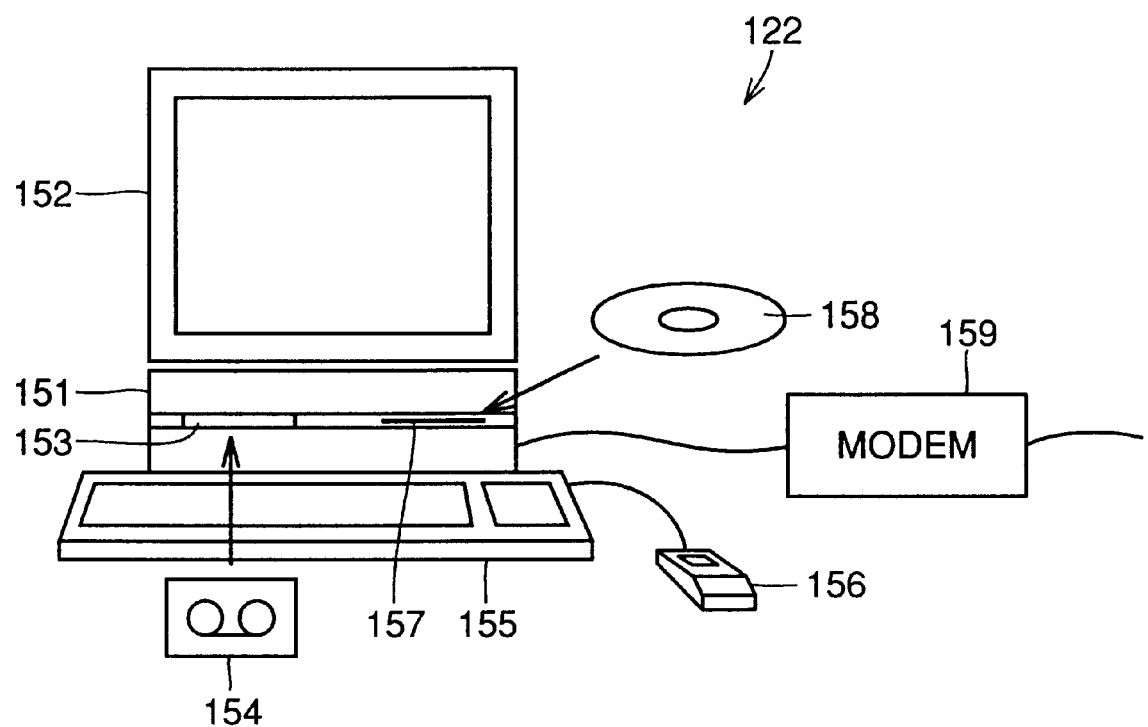
FIG. 17 is an outline view of the home server.

Referring to FIG. 17, home server 122 includes a computer 151, a keyboard 155 and a mouse 156 for instructing computer 151, a display 152 for displaying the result or the like operated by computer 151, a magnetic tape drive 153 for reading the programs executed by computer 151, a CD-ROM (Compact Disc-Read Only Memory) drive 157 and a communication modem 159.

Figure 18:
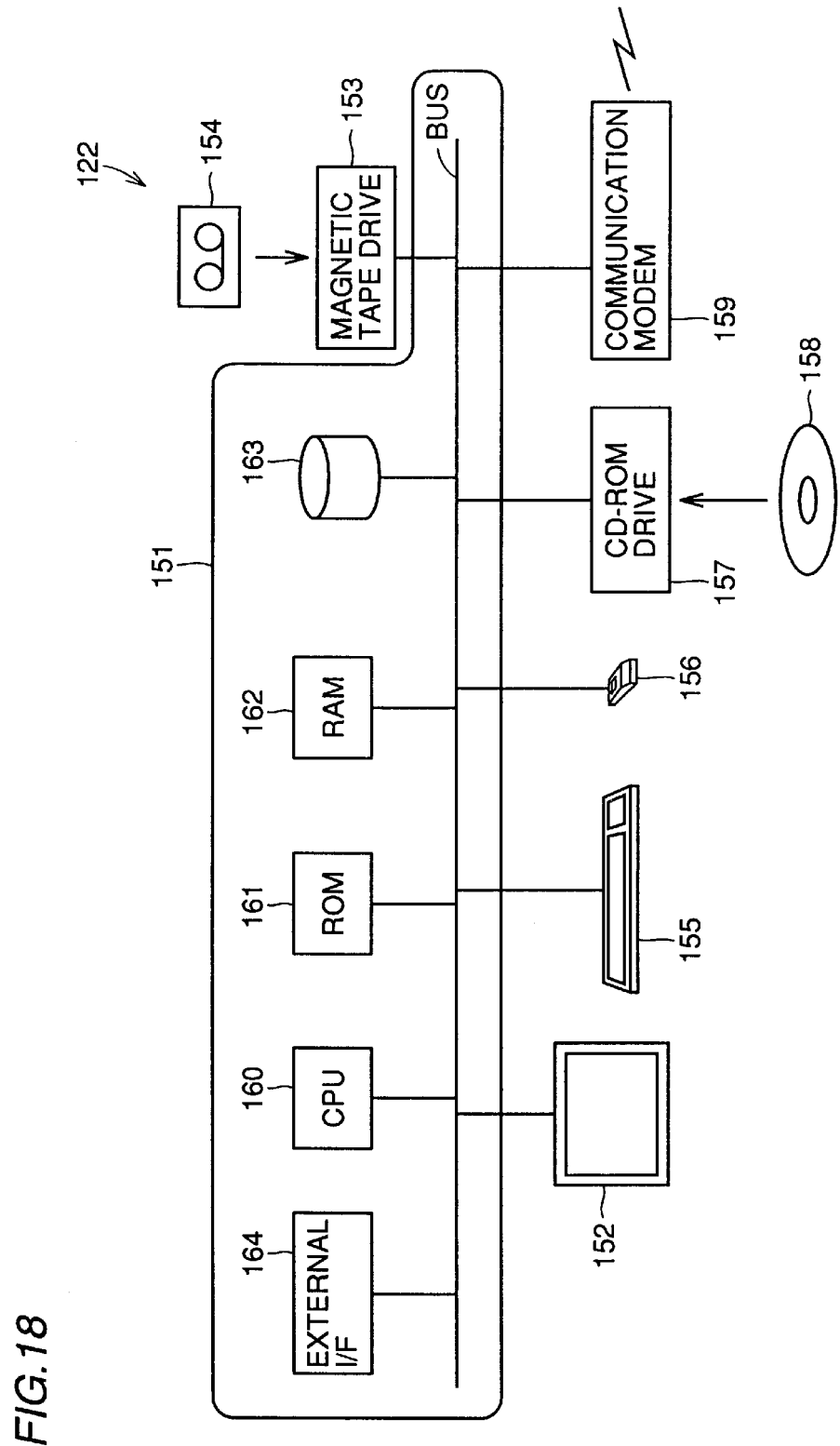
FIG. 18 is a block diagram of the configuration of the home server.

Referring to FIG. 18, computer 151 includes a CPU (Central Processing Unit) 160 for executing the programs read via magnetic tape drive 153, CD-ROM drive 157 or communication modem 159, ROM (Read Only Memory) 161 for storing the other programs and data required to operate computer 151, RAM (Random Access Memory) 162 for storing the programs, parameters on executing the programs, operation result or the like, a magnetic disc 163 for storing the programs or data, an external I/F (interface) 164 connected to devices 24A to 28C, and a bus for interconnecting the components of computer 151 with the components of home server 122.

The program realizing home server 122 is recorded in magnetic tape 154 or CD-ROM 158, which is a recording medium readable by computer 151, and is respectively read out by magnetic tape drive 153 and CD-ROM drive 157. Alternatively, it is read by communication modem 159 via the communication line.

The program executed in CPU 160 is the one for realizing the process displayed by the flow chart in FIGS. 3, 4A and 4B. The process executed by home server 122 is similar to that of home server 22 in the first embodiment. Thus, the detailed description thereof will not be repeated here.

According to the present invention, the user can rapidly obtain the information on the desired controlled devices, and simultaneously and rapidly performs remote control of a plurality of controlled devices.

Further, the state of the controlled devices can be displayed in various resolutions.

Moreover, the controlled devices can be remotely controlled by various types of control terminal devices such as a cellular phone, a personal computer system or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A home electronics system, comprising:
   a control terminal device having a display function;
   a home server configured to be in signal communication with said control terminal device via a communication network; and
   a target device coupled to said home server for operating in response to a control signal;
   said control terminal device including
   a retrieval condition transmitting unit for transmitting a retrieval condition for said target device,
   a display for displaying a state of said target device in response to data received from said home server, and
   a control signal transmitting unit for transmitting a control signal controlling said target device after displaying the state of the target device on the display;
   said home server including
   a state transmitting unit configured to create data indicating the state of said target device matching with said retrieval condition received from the control terminal device for transmitting to said control terminal device, and
   a device controlling unit for controlling said target device based on the control signal received from said control signal transmitting unit.

2. The home electronics system according to claim 1, wherein:
   said retrieval condition transmitting unit transmits a selection signal designating the target device; and
   said state transmitting unit creates data indicating the state of said target device matching with the selection signal for transmitting to said control terminal device.

3. The home electronics system according to claim 1, wherein:
   said retrieval condition transmitting unit transmits a state condition of the target device; and
   said state transmitting unit creates data indicating said target device matching with said received state condition, for transmitting to said control terminal device.

4. The home electronics system according to claim 1, wherein:
   said retrieval condition transmitting unit transmits a condition of an area where said target device is installed; and
   said state transmitting unit creates data indicating the state of said target device in an area matching with said retrieval condition for transmitting to said control terminal device.

5. The home electronics system according to claim 1, wherein:
   said home server further includes an icon memory unit for storing an icon of the target device; and
   said state transmitting unit creates data including the icon and the state of the target device matching with said retrieval condition for transmitting to said control terminal device.

6. The home electronics system according to claim 1, wherein:

said control terminal device further includes a format-transmitting unit for transmitting a format of data received by said display; and said state transmitting unit receives said format from said format-transmitting unit to transmit data in compliance with said format to said control terminal device.

7. The home electronics system according to claim 1, wherein:

said control terminal device further includes a resolution transmitting unit for transmitting data including a resolution of said display; and said state transmitting unit creates data having said resolution for transmitting to said control terminal device.

8. A home server for use with a control terminal device having a display function and a target device coupled to the home server and operating in response to a control signal issued by the control terminal device, the home server comprising:

a state transmitting unit configured to be in signal communication with said control terminal device to create data indicating a state of said target device matching a retrieval condition received from said control terminal device, for transmitting to said control terminal device, and a device controlling unit for controlling said target device in response to the control signal received from said control terminal device;

wherein the control signal is received from the control terminal device after the data indicating the state of the target device is transmitted to the control terminal device.

9. The home server according to claim 8, wherein said state transmitting unit creates data indicating a state of said target device matching with a selection signal designating said target device transmitted by said control terminal device, for transmitting to said control terminal device.

10. The home server according to claim 8, wherein said state transmitting unit creates data indicating a state of said target device matching with a state condition of said target device received from said control terminal device.

11. The home server according to claim 8, wherein said state transmitting unit creates data indicating a state of said target device in an area matching with an area condition received from said control terminal device for transmitting to said control terminal device.

12. The home server according to claim 8, further comprising an icon memory unit for storing an icon of the target device, wherein said state transmitting unit creates data including the icon and a state of said target device matching with said retrieval condition.

13. The home server according to claim 8, wherein:

said state transmitting unit, based on a signal received from the control terminal device indicating a format transmits data in compliance with the format to said control terminal device.

14. The home server according to claim 8, wherein:

said state transmitting unit, based on a signal indicating a resolution from said control terminal device, creates data having the resolution for transmitting to said control terminal device.

15. A computer readable recording medium, in which a program for controlling a computer to perform functions as a home server is recorded, said home server being used in a home electronics system including a control terminal device having a display function, and a target device coupled to said home server for operating in response to a control signal; said home server being configured to be in signal communication with said control terminal device via a communication network, wherein the program controls the computer to perform the sequential steps of:

creating data indicating a state of said target device matching a retrieval condition received from said control terminal device;

transmitting the data indicating the state of the target device to said control terminal device, receiving a control signal from the control terminal device; and controlling said target device in response to the control signal received from said control terminal device.

16. The computer readable recording medium according to claim 15, wherein:

said computer creates data indicating a state of said target device matching with a selection signal designating said target device transmitted by said control terminal device.

17. The computer readable recording medium according to claim 15, wherein said computer creates data indicating a state of said target device matching with a state condition of said target device received from said control terminal device.

18. The computer readable recording medium according to claim 15, wherein said computer creates data indicating a state of said target device in an area matching with an area condition received from said control terminal device.

19. The computer readable recording medium according to claim 15, wherein said computer, based on a signal indicating a format of said control terminal device, transmits data in compliance with the format to said control terminal device.

20. The computer readable recording medium according to claim 15, wherein said computer, based on a signal indicating resolution of said control terminal device, creates data having the resolution for transmitting to said control terminal device.

* * * * *